US012461246B2

(12) United States Patent
Guo (10) Patent No.: US 12,461,246 B2
(45) Date of Patent: Nov. 4, 2025

(54) DETECTING SPOOFING IN A GLOBAL NAVIGATION SATELLITE SYSTEM (GNSS) USING SLANT RANGE DISTANCE

(71) Applicant: Honeywell International Inc., Charlotte, NC (US)

(72) Inventor: Wen Fan Guo, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 308 days.

(21) Appl. No.: 18/355,607

(22) Filed: Jul. 20, 2023

(65) Prior Publication Data
US 2025/0028059 A1 Jan. 23, 2025

(51) Int. Cl.
*G01S 19/21* (2010.01)
*G01S 19/05* (2010.01)

(52) U.S. Cl.
CPC ............ *G01S 19/215* (2013.01); *G01S 19/05* (2013.01)

(58) Field of Classification Search
CPC combination set(s) only.
See application file for complete search history.

(56) References Cited

U.S. PATENT DOCUMENTS

| 3,975,731 | A  | 8/1976  | Latham et al. |
| 10,408,942 | B2 | 9/2019  | Kim et al. |
| 11,442,174 | B2 | 9/2022  | Cao et al. |
| 11,467,290 | B2 | 10/2022 | Savoy, Jr. |
| 2010/0106416 | A1* | 4/2010 | Yochum ................ G01S 19/49 701/469 |
| 2015/0226858 | A1 | 8/2015  | Leibner et al. |
| 2022/0171073 | A1 | 6/2022  | Savoy, Jr. |
| 2022/0171074 | A1 | 6/2022  | Savoy, Jr. |

OTHER PUBLICATIONS

Swaszek et al., GNSS Spoof Detection Using Independent Range Information, 2016, University of Rhode Island, Proceedings of the 2016 International Technical Meeting of The Institute of Navigation, pp. 739-747 (Year: 2016).*

(Continued)

*Primary Examiner* — Vladimir Magloire
*Assistant Examiner* — Eric K Hodac
(74) *Attorney, Agent, or Firm* — Fogg & Powers LLC (57) ABSTRACT

A method for detecting Global Navigation Satellite System (GNSS) spoofing is provided. The method includes receiving signals at a GNSS receiver; processing the signals to determine a calculated position; searching a list of distance measuring equipment (DME) transponders around the calculated position to select a set of DME transponders; sorting the set of DME transponders based on a respective distance between the calculated position and a respective position of each of the DME transponders; selecting a subset of the DME transponders based on the sorting; for each of the subset of the DME transponders, incrementing a counter when a difference between a real slant range, determined by communicating with the DME transponder, and an expected slant range based on height, position and known location of the DME transponder, exceeds a first threshold; and when the counter is greater than a second threshold, indicating that the position is spoofed.

20 Claims, 5 Drawing Sheets

(56) References Cited

OTHER PUBLICATIONS

Magiera et al., "Detection and Mitigation of GPS Spoofing Based on Antenna Array Processing", Journal of Applied Research & Technology, vol. 13, Issue 1, Feb. 2015, pp. 45 through 47.

Swaszek et al., "GNSS Spoof Detection Using Independent Range Information", Proceedings of the 2016 International Technical Meeting of The Institute of Navigation, Monterey, California, Jan. 2016, pp. Cover and 739 through 747.

Xiao et al., "GNSS Spoofing Detection Using pseudo-range Single Difference between Two Receivers", Advances in Engineering Research, vol. 138, 2nd International Conference on Machinery, Electronics and Control Simulation (MECS 2017), pp. 823 through 829, Atlantis Press.

European Patent Office, "Extended European Search Report", dated Jan. 3, 2025, from EP Application No. 24184667.4, from Foreign Counterpart to U.S. Appl. No. 18/355,607, pp. 1 through 14, Published: EP.

\* cited by examiner

DETECTING SPOOFING IN A GLOBAL NAVIGATION SATELLITE SYSTEM (GNSS) USING SLANT RANGE DISTANCE

BACKGROUND

Global Navigation Satellite Systems (GNSS) are well known to be accurate providers of position information across the globe. Because of high signal availabilities, robust receivers, and well-populated constellations, operators typically believe that the location information provided by their GNSS receiver is correct. More sophisticated users are concerned with the integrity of the derived location information and employ, for example, Receiver Autonomous Integrity Monitor (RAIM) algorithms to address possible satellite failure modes.

The most common attacks on GNSS availability and integrity are known as jamming and spoofing. Jamming involves the transmission of signals that interfere with GNSS reception so that the receiver is unable to provide a position or time solution. Various methods to detect jamming, and possibly overcome it, have been developed. Spoofing is the transmission of counterfeit GNSS signals to mislead a GNSS receiver into reporting an inaccurate position or time. There are two common ways of spoofing:
1. Rebroadcasting GNSS signals recorded at another place or time (so-called meaconing).
2. Generating and transmitting modified satellite signals.

If undetected, spoofing might be much more dangerous than a jamming attack. The transmitting devices used to spoof GNSS signals are called spoofers and they are RF transmitters that are closer to the targeted GNSS receiver than the GNSS satellites and hence can overpower the weak signals coming from the satellites. GNSS spoofers recreate GNSS signals of higher power compared to the real GNSS signals and trick the relatively simple GNSS receivers that are pre-programmed to use the signals with the highest possible power to calculate time and position.

GNSS signals are of two types—the encrypted Military GNSS signals called P(Y) code for government authorized use only and the civilian GNSS signals called C/A code. As the C/A code structure is openly published in a public signal-in-space interface specification, it can be recreated by a relatively competent adversary who can then accurately generate a "spoofed" version of the GNSS signal and then transmit them to deceive a local GNSS receiver. If the targeted GNSS receiver is unable to tell the difference between the real satellite signals and the spoofed signals, it will calculate its position according to the false signals and hence display the receiver as appearing to be at a different location.

To combat spoofing, GNSS receivers need to detect spoofed signals out of a mix of authentic and spoofed signals. Once a satellite signal is flagged as spoofed, it can be excluded from use in positioning calculations. There are various levels of spoofing protection that a receiver can offer. The best way to be protected against spoofing is to use P(Y) code signals of GNSS, but they're only available to a select few entities to keep its security features intact. The general public, however, has to use C/A code signals of the GNSS.

Among civilian GNSS receivers, anti-spoofing measures usually consists of using multi-constellation receivers that can receive position, navigation and timing (PNT) signals from multiple GNSS constellations. Spoofing GNSS signals of multiple constellations simultaneously would require significantly more powerful and complex RF transmitters. Hence, using multi-constellation signals, these civilian receivers can refer to signals from other constellations to ensure that the GNSS signals they are receiving are authentic and accurate. Some other anti-spoofing strategies also include using an inertial measurement unit (IMU) which is a device that measures and reports the body's specific force, angular rate, and sometimes the orientation of the body, using a combination of accelerometers, gyroscopes, and sometimes magnetometers. IMUs can be an additional measure of protection by aiding the navigation solution as an adversary cannot spoof the Earth's gravitational field or vehicle dynamics and cause the IMU to think it has moved in a way that it has not.

Although using multiple constellations provides redundancy, diversity, and improved accuracy, it also requires more complex integration and compatibility considerations. Integrating and processing signals from multiple constellations requires more complex algorithms and hardware, which can increase system complexity and cost. Ensuring compatibility and interoperability among different satellite constellations can be a challenge, as each constellation may have unique characteristics and requirements.

Using an inertial measurement unit (IMU) to detect Global Navigation Satellite System (GNSS) spoofing also has its vulnerability to sensor errors and biases. The IMU relies on the measurements from accelerometers and gyroscopes to determine its position, velocity, and attitude. These sensors can introduce errors, drift, and biases over time. Spoofing attacks involve manipulating the signals received by the GNSS receiver, which can lead to inaccurate position and velocity estimates. In such cases, the IMU may mistakenly interpret the spoofed signals as genuine, leading to incorrect navigation solutions. Furthermore, sophisticated spoofing techniques can include synchronized spoofing of both the GNSS signals and the inertial sensor measurements. This can make it even more challenging for the IMU to detect the spoofing attack, as the sensor measurements may appear consistent with the manipulated GNSS signals. Another limitation of using the IMU for GNSS spoofing detection is its reliance on a single sensor system. If the IMU itself becomes compromised or manipulated during a spoofing attack, it may provide inaccurate or misleading information, making it difficult to detect the spoofing.

Thus, there is a need in the art for improved techniques for detecting spoofing in a GNSS that overcome the problems identified above.

SUMMARY

A method for detecting Global Navigation Satellite System (GNSS) spoofing is provided. The method includes receiving signals at a GNSS receiver; processing the signals to determine a calculated position; searching a list of distance measuring equipment (DME) transponders around the calculated position to select a set of DME transponders; sorting the set of DME transponders based on a respective distance between the calculated position and a respective position of each of the DME transponders; selecting a subset of the DME transponders based on the sorting; for each of the subset of the DME transponders, incrementing a counter when a difference between a real slant range, determined by communicating with the DME transponder, and an expected slant range based on height, position and known location of the DME transponder, exceeds a first threshold; and when the counter is greater than a second threshold, indicating that the position is spoofed.

BRIEF DESCRIPTION OF THE DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention use inputs from systems, such as distance measuring equipment (DME) and a radio altimeter, to detect spoofing in a Global Navigation Satellite System (GNSS) using a slant range from a vehicle to a plurality of known locations. As used in this specification, the term GNSS includes, but is not limited to, Global Positioning System (GPS), GLONASS, Galileo, and BeiDou. Thus, the teachings of the present invention may be used in a system that uses satellites from any one or more of these systems to provide navigation solutions for a vehicle.

Embodiments of the present invention detect spoofing in a GNSS based on comparisons of slant ranges determined using a plurality of DME transponders (the "real slant ranges") with calculations of the slant range from the position reported by the GNSS receiver to the known locations of the DME transponders (the "expected slant ranges"). If these comparisons show a significant enough discrepancy, then spoofing is detected and can be reported to other vehicles and ground stations.

Figure 1A:
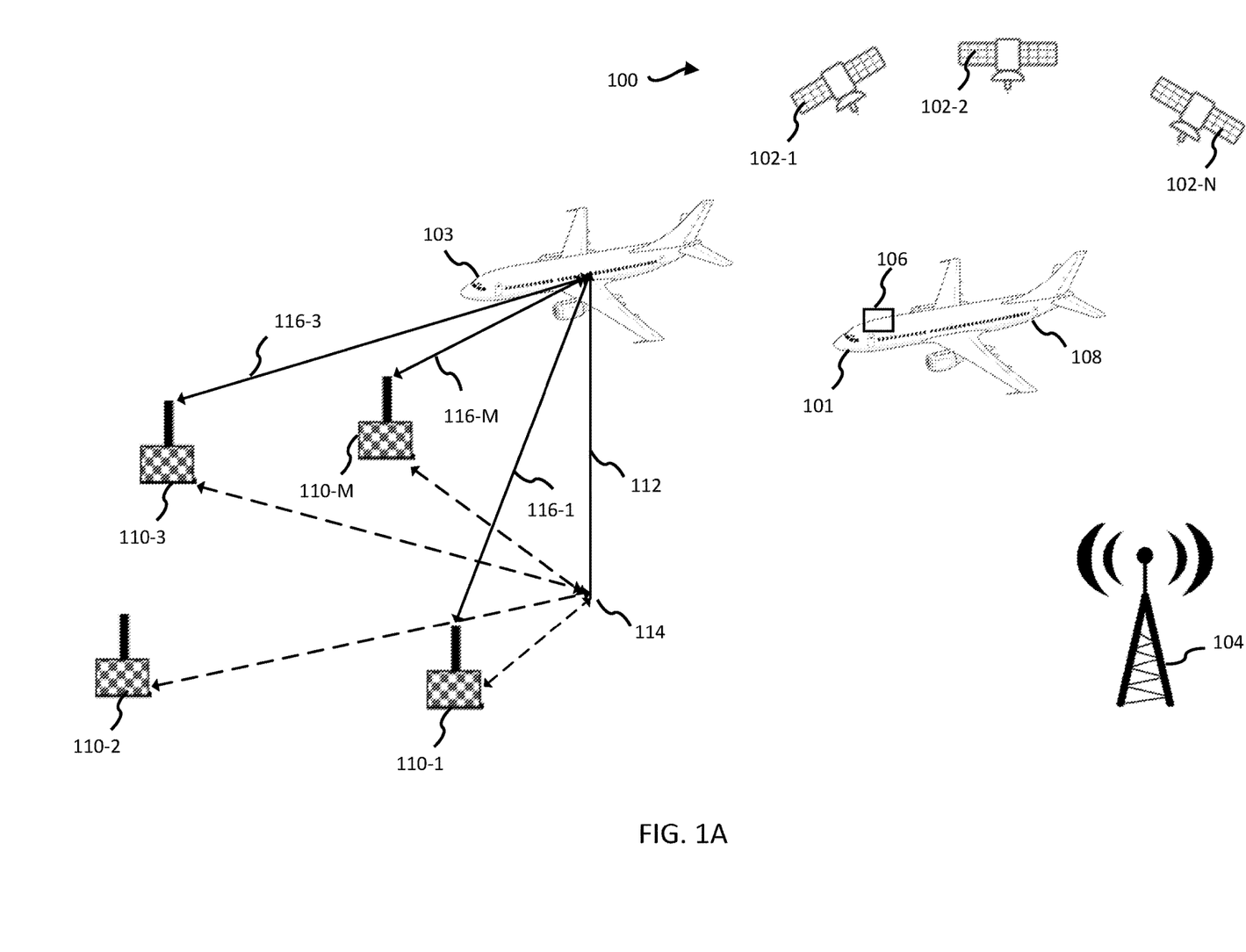
FIG. 1A and FIG. 1B are schematic diagrams that illustrate one embodiment of a process for detecting spoofing in a Global Navigation Satellite System (GNSS) using slant range distance.
Figure 1B:
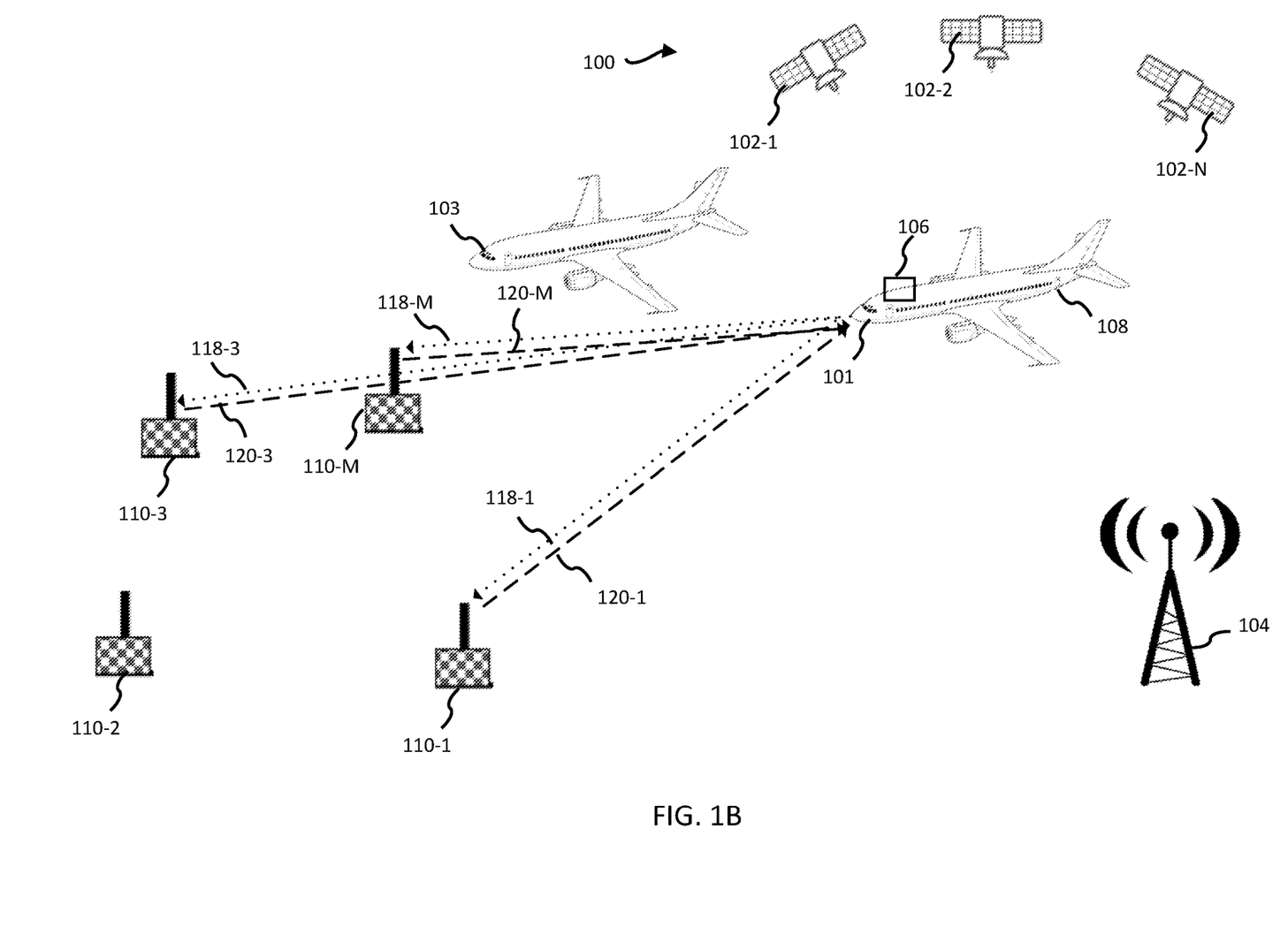

FIG. 1A and FIG. 1B are schematic diagrams that illustrate one embodiment of a process for detecting spoofing in a Global Navigation Satellite System (GNSS) using slant range distances. In this example, aircraft 108 navigates using signals from a plurality of satellites 102-1 to 102-N in a GNSS 100 in an area where a spoofer is operating a transmitter 104 to disrupt the use of the GNSS 100. Although this example is illustrated using an aircraft, it is understood that the teachings of the present invention are not limited to aircraft. Rather, the teachings apply to any appropriate vehicle (land, water or air) that uses a GNSS receiver in an area that could experience spoofing of GNSS signals. It is noted that the true position of aircraft 108 is indicated at 101 and the position, spoofed by transmitter 104, is indicated at 103. Spoofed position 103 is the position determined by GNSS receiver 106 onboard aircraft 108. Also illustrated in FIG. 1A and FIG. 1B are a plurality of distance measuring equipment transponders (DME transponders) 110-1 to 110-M.

The process detects spoofing by comparing two measures of slant ranges to a plurality of DME transponders. One measure of the slant range is based on a position of vehicle 108 determined using the output of GNSS receiver 106 (the "expected slant range"). In this case, transmitter 104 is transmitting signals that overpower the signals from satellites 102-1 to 102-N. GNSS receiver 106 processes the signals from transmitter 104. Based on those signals, GNSS receiver 106 determines that aircraft 108 is in spoofed position 103.

The process uses the position identified by GNSS receiver 106 to select a number of DME transponders 110-1 to 110-M that are closest to the position determined by the GNSS receiver 106. For example, in one embodiment, the position of aircraft 108 is determined to be spoofed position 103. Aircraft 108 is located at an altitude 112 above position 114 on the ground. The process searches a list of DME transponders around position 114 to select a set of DME transponders for testing the integrity of the signals received at GNSS receiver 106. The process sorts the list of DME transponders by distance and then selects a subset of the DME transponders, e.g., 3 or more DME transponders. In this example, the process identifies the three DME transponders closest to position 114 to include in the subset: DME transponders 110-1, 110-3 and 110-M are closest to position 114 as shown in FIG. 1A. The process then calculates the slant ranges 116-1, 116-3, and 116-M from the spoofed position 103 to the members of the subset of DME transponders 110-1, 110-3 and 110-M, respectively, to obtain one measure of the slant range for the comparisons: the expected slant range.

The process also communicates with each DME transponder in the subset of DME transponders 110-1, 110-3, and 110-M, to determine a second measure of the slant ranges (the "real slant range"). In one embodiment, this includes, for each DME transponder in the subset of DME transponders, autotuning a DME transmitter on aircraft 108 to the frequency of the DME transponder to send an interrogation pulse pair 118-1, 118-3, and 118-M to the DME transponders, respectively. Further, the process includes receiving a reply pulse pair 120-1, 120-3 and 120-M, respectively, on a different frequency from the DME transponders. The process determines the real slant range for a specific DME transponder by observing a time difference between the interrogation pulse pair and the receipt of the reply pulse pair.

The process compares the real slant ranges with the expected slant ranges. For example, the process may calculate a difference between the real slant ranges and the corresponding expected slant ranges for each DME transponder in the subset of DME transponders. For each DME transponder that results in a difference that exceeds a threshold, the process increments a counter. If, after all of the DME transponders in the subset of DME transponders have been considered, the counter exceeds a second threshold, then the process has detected spoofing, e.g., spoofing by transmitter 104. An indication of this determination may then be broadcast to other vehicles or ground stations.

Figure 2:
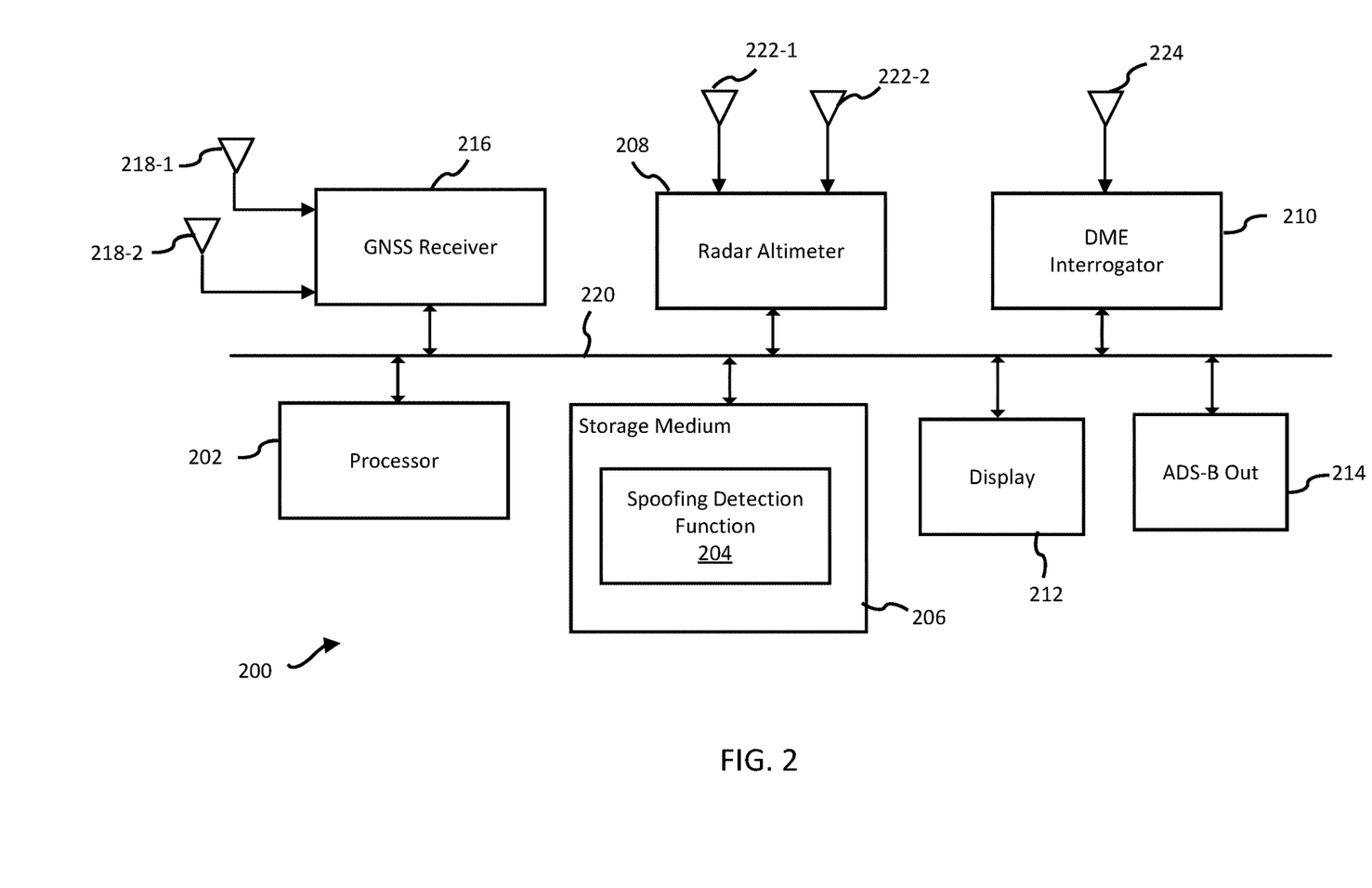
FIG. 2 is a block diagram that illustrates one embodiment of a system for detecting spoofing in a GNSS using slant range distance.

FIG. 2 is a block diagram that illustrates one embodiment of a system, indicated generally at 200, for detecting spoofing in a Global Navigation Satellite System (GNSS) using slant range distances. System 100 is installed on a vehicle that navigates using signals received by GNSS receiver 216. Because GNSS is vulnerable to spoofing attacks, system 200 includes processor 202 and spoofing detection function 204 stored as executable code on storage medium 206 such that the code of spoofing detection function, when run on processor 202, causes processor 202 to perform a process, such as the process described above with respect to FIG. 1A and FIG. 1B or the process described below with respect to FIG. 3 or FIG. 4, to detect when system 200 is processing spoofed GNSS signals. Processor 202 may be implemented using one or more processors, a field programmable gate array (FPGA), an application specific integrated circuit (ASIC), a controller or other circuit used to execute instructions in an electronic circuit. Storage medium 206 can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as a program product comprising instructions stored in non-transitory computer readable media, such as random access memory (RAM), read-only memory (ROM), non-volatile RAM, electrically-erasable programmable ROM, flash memory, or other storage media.

To aid in this process, spoofing detection function 204 uses data from radar altimeter 208 and distance measuring equipment interrogator (DME interrogator) 210 in some embodiments. Radar altimeter 208 includes antenna 222 and DME interrogator 210 includes antenna 224. Additionally, system 200 includes display 212 to provide a visual or audio warning to an operator when spoofing is detected. Furthermore, system 200 also includes ADS-B Out which is capable of broadcasting an indication of the detected spoofing to other vehicles and ground stations.

System 200 includes GNSS receiver 216 that is coupled to antennas 218-1 and 218-2. GNSS receiver 216 handles GNSS inputs processing and also manages source selection between two GNSS sources; one received on antenna 218-1 and one received on antenna 218-2. GNSS receiver 216 calculates and outputs navigation data, satellite measurement data, receiver autonomous integrity monitoring (RAIM), and predictive RAIM (PRAIM). In one embodiment, GNSS receiver 216 is a function running on processor 202. In other embodiment, GNSS receiving 216 is a separate device that is configured to communicate with processor 202 over a bus 220. In some embodiments, GNSS receiver 216 also manages sign status matrix (SSM), manages satellite status, performs BITE functions, performs data loader operations, provides memory access function, and transmits custom data. GNSS receiver 216 also computes a pseudo-range to the satellites by timing the arrival of signals from the satellites. GNSS receiver 216 uses the pseudo-range data to compute its internal clock offset and a three-dimensional position fix. From this data, GNSS receiver 216 creates position, velocity, time, and integrity parameters. This group of data, collectively known as the navigation block, is transmitted onto bus 220. The navigation block data is used by spoofing detection function 204 to calculate the expected slant ranges to a plurality of DME transponders. The expected slant ranges are used, in combination with other data, to detect when GNSS spoofing occurs.

System 200 also includes DME interrogator 210. DME interrogator 210 is responsible to manage the communication with DME transponders and calculate the real slant range distance to the DME transponders. DME interrogator 210 provides accurate continuous enroute slant-range distance to selected DME transponders as well as for non-precision approaches in terminal operations. DME interrogator 210 derives slant-range distance by transmitting an interrogation pulse-pair with specified spacing to the DME transponder. The DME transponder receives the interrogation and after a specified time delay, transmits a reply pulse-pair on a different frequency. The DME interrogator receives the reply, decodes it and measures the time difference between the interrogation and the reply. This time delay represents the distance to the station. Conventionally, DME operates in 962 MHz to 1213 MHz frequency band where 1025 MHz to 1150 MHz is allocated for transmitter and 962 MHz to 1213 MHz for the receiver. The frequency delta between received and transmitted signal is always 63 MHz. The channel spacing between the various DME channels is 1 MHz. Each DME channel has two different codings (X and Y) that differ with regard to their pulse spacing. The DME interrogator is capable of computing distance for up to 5 directed DME transponders and determines the DME transponder identification (Morse code), for the channel selected for identification, using sampling methods. The identification characters are output as a real-time audio signal and also digitally as ISO-5 (ISO Alphabet #5) characters in ARINC 429 identification words.

The DME interrogator will compute the distance (slant-range) to up to 5 DME transponders based on the time interval (time delay) between the interrogation pulse and the reply pulse. The speed of round-trip propagation from DME interrogator 210 to the DME transponder and return is 12.3590 microseconds per nautical mile.

The DME interrogator 210 will start searching the presence of the DME transponder when its frequency is first received in a valid DME Frequency/Function Word. If at least one transmission from the DME transponder is detected during the search, DME interrogator 210 will initiate search interrogations to acquire the distance of the DME transponder. The search for the DME transponder will be continued until a distance is acquired. If distance is acquired for the DME transponder, the DME transponder will be tracked with track interrogations. The DME transponder will be removed from the search, when it is in search and its frequency is not received in valid DME Frequency/Function Words. The acquisition time of distance information (including channeling time) will be 1 second or less with a one sigma probability factor, and 1.5 seconds or less with a two sigma probability factor. The DME interrogator will not lock-on or report false distance information in the presence of an on-channel signal at any level less than −48 dBm consisting of 7200 random pulse pairs. The intent is to ensure that the DME will not exhibit false acquisition on squitter and noise when two TACAN and/or DME transponders are received at the same time.

System 200 also includes radar altimeter 208. Radar altimeter 208 Altimeter provides the height above ground by monitoring radio reflection signal. Radio altimeter 208 is an airborne electronic device capable of measuring the height of the aircraft above terrain immediately below the aircraft. Radio altimeter 208 transmits a carrier wave at 4.3 GHz from the aircraft to the ground using a transceiver and directional antenna 222-1. The wave travels at a constant speed and is frequency modulated at 50 MHz. It collides with surface objects and bounces back toward the aircraft, where it is picked up by a second antenna 222-2. The transceiver processes the signal by measuring the elapsed time the signal travelled and the frequency modulation that occurred. The display indicates height above the terrain (ground) also known as above ground level (AGL). Radio altimeter 208 works on the principle of electromagnetic wave pulses being reflected by the terrain (earth's or sea's surface). These waves are part of the radio spectrum. Because electromagnetic waves travel at the speed of light, calculating the distance is almost instantaneous. Radio altimeters are a reliable and precise way of measuring height, despite being impacted by surface irregularities which create deviations in the radio signal. The time it takes the wavefront to travel from the aircraft to the surface and back is used to compute altitude.

System 200 also includes spoofing detection function 204 that is run on processor 202. Spoofing detection function 204 detects whether the position provided by GNSS receiver 216 is spoofed or not by comparing the real slant range to a DME transponder, based on signals communicated with a DME transponder, and a calculated slant range to the DME transponder, based on the position of the DME transponder, the position reported by the GNSS receiver and the height reported by the radar altimeter. Embodiments of suitable spoofing detection functions are described below with respect to FIG. 3 and FIG. 4.

System 200 is enabled to report when spoofing is detected. First, system 200 includes a display. Spoofing detection function 204, in one embodiment, causes an indication of spoofing to be displayed on display 212 when spoofing is detected. In other embodiments, spoofing detection function 204 also causes ADS-B Out 214 to broadcast information concerning the spoofing to other vehicles and ground stations. For example, when GNSS spoofing is detected, the radio frequency interference (RFI) status bits may be set in the squitter and downlinked to the air traffic control center (ATCC). ADS-B ground stations process RFI status and allow generating an integrated RFI status picture for multiple aircraft. The ATCC can use it to set the boundary of a spoofed GNSS signal on the MAP and notify this information to other aircraft flying around this area. Technical services can coordinate with ATCC on impacted areas and launch mitigation measures. ADS-B may also provide confirmation when the spoofing event is finished.

Figure 3:
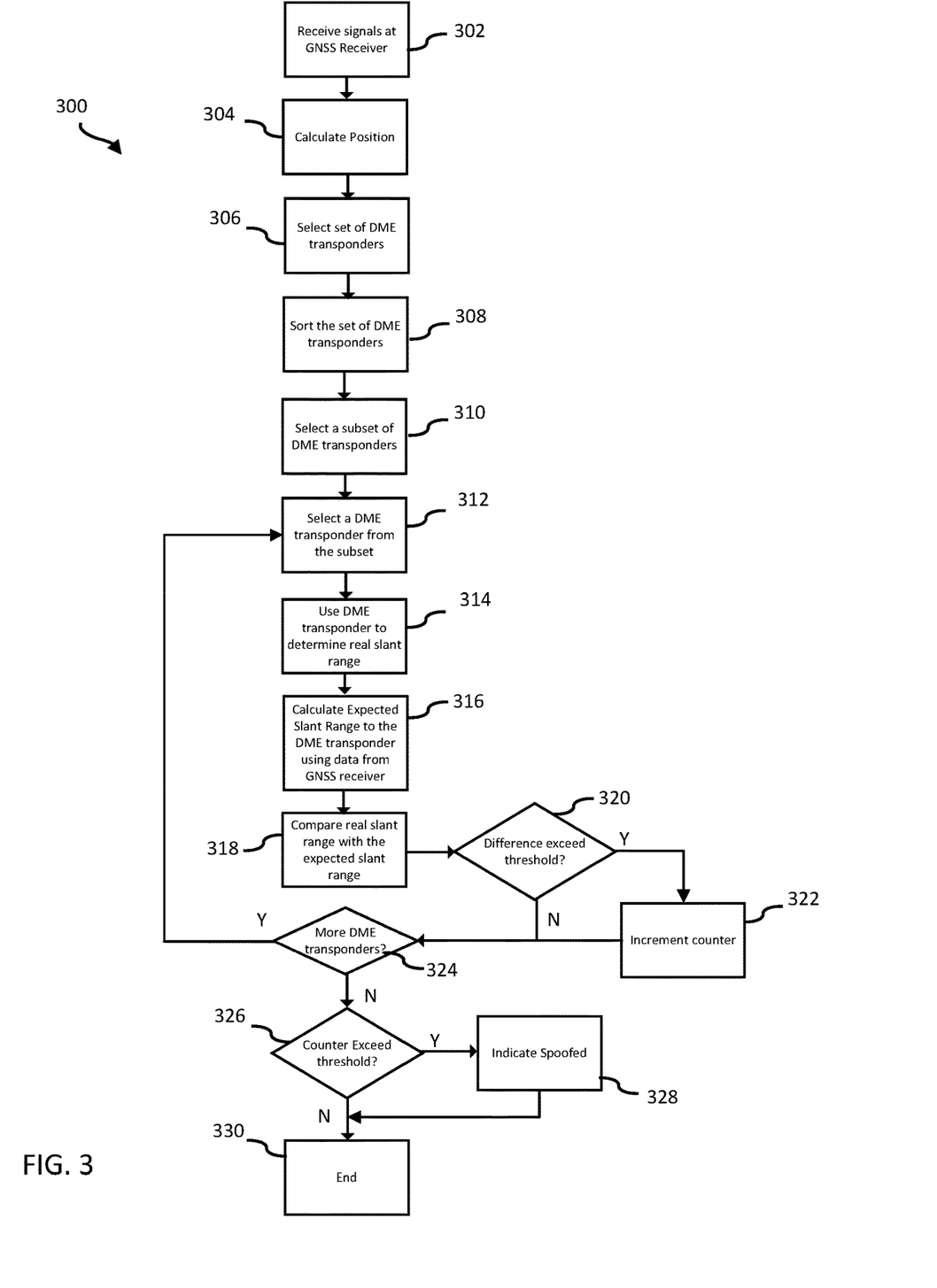
FIG. 3 is a flow chart of one embodiment of a process for detecting spoofing in a GNSS using slant range distance.

FIG. 3 is a flow chart of one embodiment of a process, indicated generally at 300, for detecting spoofing in a GNSS using slant range distances. For pedagogical purposes, the process of FIG. 3 is described in conjunction with FIG. 1A and FIG. 1B. At block 302, process 300 receives signals at a GNSS receiver. For example, GNSS receiver 106 on aircraft 108 receives signals that purport to be from satellites 102-1 to 102-N of GNSS 100. In this instance, however, a spoofer is operating a transmitter 104 in the area of aircraft 108, so GNSS receiver 106 also receives signals from transmitter 104. Process 300 calculates the position of vehicle 108 based on the signals received at GNSS receiver 106 at block 304. Because signals from transmitter 104 are present, GNSS receiver 106 calculates the position of aircraft 108 to be at spoofed position 103 rather than the actual position, 101, of aircraft 108.

Process 300 uses a number of DME transponders to check the integrity of the signals received at GNSS receiver 106. At block 306, process 300 selects a set of DME transponders to use for this integrity check. In one embodiment, process 300 searches a list of DME transponders around the calculated position (103) to select a set of DME transponders for testing integrity of the signals received by the GNSS receiver. At block 308, process 300 sorts the set of DME transponders in order based on a respective distance between the calculated position and a respective position of each of the DME transponders in the set of DME transponders. As shown in FIG. 1A, process 300 uses the distance from position 114 (ground position below the calculated position) to sort the set of DME transponders in one embodiment. At block 310, process 300 selects a subset of the DME transponders from the set of DME transponders based on the sorting. In one embodiment, the subset includes at least three DME transponders. In other embodiments, any appropriate number of DME transponders can be used.

Process 300 then uses the subset of DME transponders to test the integrity of the signals received at the GNSS receiver. At block 312, process 300 selects one of the DME transponders in the subset of DME transponders. At block 314, process 300 uses the selected DME transponder to determine the real slant range from aircraft 108 to the DME transponder as shown, for example, in FIG. 1B. In one embodiment, process 300 determines the real slant range for the DME transponder by autotuning to a frequency corresponding to a frequency of the DME transponder and observing a time difference (time delay) between an interrogation pulse pair transmitted from the aircraft and the receipt of the reply pulse pair from the DME transponder. At block 316, process 300 calculates the expected slant range to the DME transponder using the data from the GNSS receiver, the known location of the DME transponder and the height of aircraft 108 derived from, for example, a radar altimeter. At block 318, process 300 compares the real slant range with the expected slant range to the DME transponder. If the difference between the real slant range and the expected slant range exceeds a threshold, as determined at block 320, process 300 increments a counter at block 322 that tracks the number of DME transponders that indicate spoofing is likely to have occurred. If the real slant range and the expected slant range are close in value (the difference is less than the threshold), process 300 does not increment the counter. Process 300 proceeds from block 320 or block 322 to block 324 to determine if there are other DME transponders in the subset of DME transponders that have not been considered yet. If so, process 300 returns to block 312 and selects and processes another DME transponder.

Once all of the DME transponders in the subset of DME transponders have been considered, process 300 determines if spoofing has occurred. At block 326, process 300 determines if the counter exceeds a threshold. For example, if three DME transponders have been used, process 300 checks the counter against a threshold of 2. If the counter indicates that at least 2 of the three DME transponders indicated a variance between real and expected slant ranges that exceeds the threshold, then process 300 determines that spoofing has occurred. At block 328, process 300 provides an indication of the spoofing by, for example, providing an indication on a display in the cockpit of aircraft 108. Otherwise, process 300 determines that there has been no spoofing and process 300 ends at 330.

In some embodiments, the power level of the signal received from the DME is used as a check on the determination at block 320 whether spoofing has been detected. Specifically, for each DME transponder in the subset of the DME transponders, process 300 samples and filters a power level of a received signal from the DME transponder for a period of time at block 314. At block 318, process 300 further correlates the power level of the signal from the DME transponder to the distance between the calculated position and the position of the corresponding DME transponder. Furthermore, in this embodiment, process 300 increments the counter at block 322 if (1) the power level correlates to the distance between the calculated position and the position of the corresponding DME transponder; and (2) the difference exceeds the threshold. If the power level does not correlate to the distance, process 300 replaces the DME transponder in the subset of DME transponders with another DME transponder from the set of DME transponders at 324 and returns to block 312.

In another embodiment, process 300 uses the power level in another way as a check on the data. Specifically, process 300 verifies whether power levels of the received signals from the set of DME transponders have a same order as the distances for the respective DME transponders in the set of DME transponders. If the power level for one of the DME transponders in the subset of DME transponders does not correlate to the distance, process 300 replaces the DME transponder in the subset of DME transponders with another DME transponder from the set of DME transponders.

Figure 4:
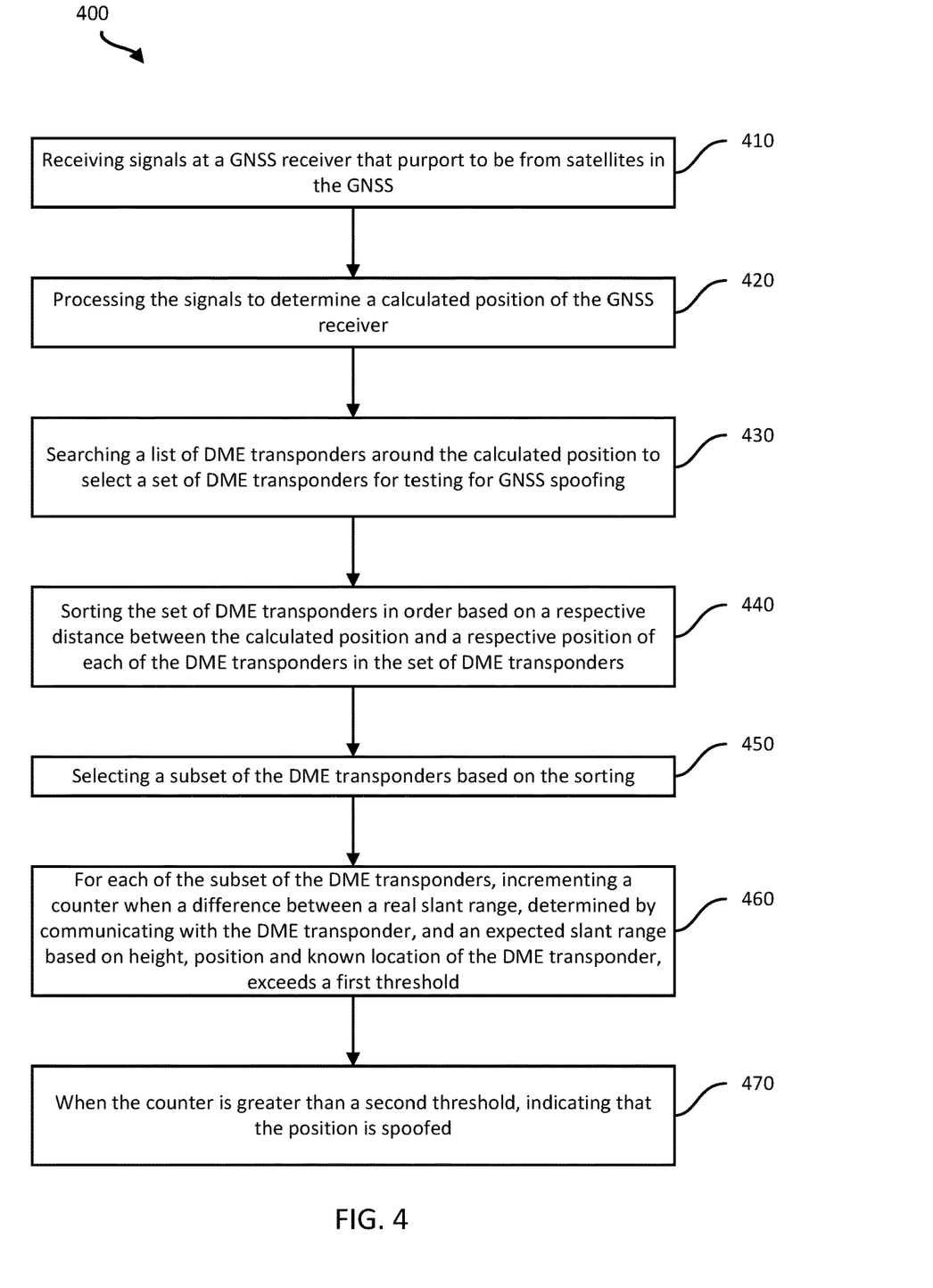
FIG. 4 is a flow chart of another embodiment of a process for detecting spoofing in a GNSS using slant range distance.

FIG. 4 is a flow chart of another embodiment of a process, indicated at 400, for detecting spoofing in a GNSS using slant range distances. As with FIG. 3, process 400 is described with reference to FIG. 1A and FIG. 1B. At block 410, process 400 receives signals at a GNSS receiver that purport to be from satellites 102-1 to 102-N in the GNSS 100. At block 420, process 400 processes the signals to determine a calculated position of the GNSS receiver 106, and, aircraft 108. At block 430, process 400 searches a list of distance measuring equipment transponders (DME transponders) around the calculated position to select a set of DME transponders for testing for GNSS spoofing. At block 440, process 400 sorts the set of DME transponders in order based on a respective distance between the calculated position and a respective position of each of the DME transponders in the set of DME transponders. At block 450, process 400 selects a subset of the DME transponders based on the sorting. This subset of DME transponders provides the basis for detecting spoofing.

At block 460, process 400 determines, separately for each DME transponder in the subset of DME transponders, a measure of whether GNSS spoofing is present. For each of the subset of DME transponders, process 400 increments a counter when a difference between a real slant range, determined by communicating with the DME transponder, and an expected slant range based on height, position and known location of the DME transponder, exceeds a first threshold. Finally, if the counter is greater than a second threshold, process 400 generates an indication that the position is spoofed. In some embodiments, the indication is displayed to the operator of a vehicle. In other embodiments, the indication is broadcast to other vehicles or ground stations.

EXAMPLE EMBODIMENTS

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

Example 1 includes a method for detecting spoofing in a Global Navigation Satellite System (GNSS), the method comprising: receiving signals at a GNSS receiver that purport to be from satellites in the GNSS; processing the signals to determine a calculated position of the GNSS receiver; searching a list of distance measuring equipment transponders (DME transponders) around the calculated position to select a set of DME transponders for testing integrity of the signals received by the GNSS receiver; sorting the set of DME transponders in order based on a respective distance between the calculated position and a respective position of each of the DME transponders in the set of DME transponders; selecting a subset of the DME transponders from the set of DME transponders based on the sorting; for each DME transponder in the subset of the DME transponders, autotuning to a frequency corresponding to a frequency of the DME transponder; determining a real slant range from the DME transponder; sampling and filtering a power level of a received signal from the DME transponder for a period; calculating an expected slant range based on height, position and known location of the DME transponder; comparing the real slant range with the expected slant range to produce a difference; and when the difference exceeds a first threshold, incrementing a counter; when the counter exceeds a second threshold, indicating that the position is spoofed and broadcasting an indication to other vehicles or ground stations.

Example 2 includes the method of example 1, and further comprising, for each DME in the subset of the DME transponders, correlating the power level to the distance between the calculated position and the position of the corresponding DME transponder, and wherein incrementing the counter comprises incrementing the counter if (1) the power level correlates to the distance between the calculated position and the position of the corresponding DME transponder; and (2) the difference exceeds the first threshold.

Example 3 includes the method of example 2, when the power level does not correlate to the distance, replace the DME transponder in the subset of DME transponders with another DME transponder from the set of DME transponders.

Example 4 includes the method of any of examples 1 to 3, and further comprising verifying whether power levels of the received signals from the set of DME transponders have a same order as the distances for the respective DME transponders in the set of DME transponders.

Example 5 includes the method of example 4, when the power level for one of the DME transponders in the subset of DME transponders does not correlate to the distance, replace the DME transponder in the subset of DME transponders with another DME transponder from the set of DME transponders.

Example 6 includes the method of any of examples 1 to 5, wherein selecting a subset of DME transponders comprises selecting a subset of at least three DME transponders.

Example 7 includes the method of example 6, wherein the second threshold is two.

Example 8 includes the method of any of example 1 to 7, wherein autotuning to the frequency corresponding to the frequency of the DME transponder includes transmitting an interrogation pulse pair to the DME transponder and receiving a reply pulse pair on a different frequency.

Example 9 includes the method of example 8, wherein determining the real slant range comprises determining a time difference between the interrogation pulse pair and the reply pulse pair.

Example 10 includes the method of example 9, wherein calculating the expected slant range based on height includes measuring the altitude with a radio altimeter.

Example 11 includes a method for detecting spoofing in a Global Navigation Satellite System (GNSS), the method comprising: receiving signals at a GNSS receiver that purport to be from satellites in the GNSS; processing the signals to determine a calculated position of the GNSS receiver; searching a list of distance measuring equipment transponders (DME transponders) around the calculated position to select a set of DME transponders for testing the integrity of the signals received by the GNSS receiver; sorting the set of DME transponders in order based on a respective distance between the calculated position and a respective position of each of the DME transponders in the set of DME transponders; selecting a subset of the DME transponders from the set of DME transponders based on the sorting; for each DME transponder in the subset of the DME transponders, autotuning to a frequency corresponding to a frequency of the DME transponder; recording a real time delay for the DME transponder; sampling and filtering a power level of a received signal from the DME transponder for a period; calculating an expected time delay based on height, position and known location of the DME transponder; comparing the real time delay with the expected time delay to produce a difference; and when the difference exceeds a first threshold, incrementing a counter; when the counter exceeds a second threshold, indicating that the position is spoofed and broadcasting an indication to other vehicles or ground stations.

Example 12 includes the method of example 11, and further comprising, for each DME transponder in the subset of the DME transponders, correlating the power level to the time delay between the calculated position and the position of the corresponding DME transponder, and wherein incrementing the counter comprises incrementing the counter if (1) the power level correlates to the time delay between the calculated position and the position of the corresponding DME transponder; and (2) the difference exceeds the first threshold.

Example 13 includes the method of example 12, when the power level does not correlate to the time delay, replace the DME transponder in the subset of DME transponders with another DME transponder from the set of DME transponders.

Example 14 includes the method of any of examples 11 and 12, and further comprising verifying whether power levels of the received signals from the set of DME transponders have a same order as the time delay for the respective DME transponders in the set of DME transponders.

Example 15 includes the method of example 14, when the power level for one of the DME transponders in the subset of DME transponders does not correlate to the time delay, replace the DME transponder in the subset of DME transponders with another DME transponder from the set of DME transponders.

Example 16 includes the method of any of examples 11 to 15, wherein autotuning to the frequency corresponding to the frequency of the DME transponder includes transmitting an interrogation pulse pair to the DME transponder and receiving a reply pulse pair on a different frequency.

Example 17 includes the method of example 16, wherein recording a real time delay comprises determining a time difference between the interrogation pulse pair and the reply pulse pair.

Example 18 includes a system for detecting Global Navigation Satellite System (GNSS) spoofing, the system comprising: a GNSS receiver that is configured to receive signals that purport to be from satellites in the GNSS; a processor, in communication with the GNSS receiver, that is configured to run a spoofing detection function, which, when executed by the processor cause the processor to perform the method including: calculating a position of the GNSS receiver using the signals; searching a list of distance measuring equipment transponders (DME transponders) around the calculated position to select a set of DME transponders for testing for GNSS spoofing; sorting the set of DME transponders in order based on a respective distance between the calculated position and a respective position of each of the DME transponders in the set of DME transponders; selecting a subset of the DME transponders based on the sorting; for each of the subset of the DME transponders, incrementing a counter when a difference between a real slant range, determined by communicating with the DME transponder, and an expected slant range based on height, position and known location of the DME transponder, exceeds a first threshold; and when the counter is greater than a second threshold, indicating that the position is spoofed.

Example 19 includes the system of example 18, wherein, for each of the subset of the DME transponders, the spoofing detection function, when run on the processor, further causes the processor to perform the method including: sampling and filtering a power level of a received signal from the DME transponder for a period; and correlating the power level to the distance between the calculated position and the position of the corresponding DME transponder.

Example 20 includes the system of example 19, and wherein the spoofing detection function, when run on the processor, further causes the processor to perform the method including verifying whether power levels of the received signals from the set of DME transponders have a same order as the distances for the respective DME transponders in the set of DME transponders.

What is claimed is:

1. A method for detecting spoofing in a Global Navigation Satellite System (GNSS), the method comprising:
   receiving signals at a GNSS receiver that purport to be from satellites in the GNSS;
   processing the signals to determine a calculated position of the GNSS receiver;
   searching a list of distance measuring equipment transponders (DME transponders) around the calculated position to select a set of DME transponders for testing an integrity of the signals received by the GNSS receiver;
   sorting the set of DME transponders in order based on a respective distance between the calculated position and a respective position of each of the DME transponders in the set of DME transponders;
   selecting a subset of the DME transponders from the set of DME transponders based on the sorting;
   for each DME transponder in the subset of the DME transponders, autotuning to a frequency corresponding to a frequency of the DME transponder;
   determining a real slant range from the DME transponder;
   sampling and filtering a power level of a received signal from the DME transponder for a period;
   calculating an expected slant range based on a height, position, and known location of the DME transponder;
   comparing the real slant range with the expected slant range to produce a difference, and
   when the difference exceeds a first threshold, incrementing a counter,
   when the counter exceeds a second threshold, indicating that the position is spoofed and broadcasting an indication to vehicles or ground stations.

2. The method of claim 1, and further comprising, for each DME in the subset of the DME transponders, correlating the power level to the distance between the calculated position and the position of the corresponding DME transponder, and wherein incrementing the counter comprises incrementing the counter if (1) the power level correlates to the distance between the calculated position and the position of the corresponding DME transponder; and (2) the difference exceeds the first threshold.

3. The method of claim 2, further comprising replacing the DME transponder in the subset of DME transponders with another DME transponder from the set of DME transponders when the power level does not correlate to the distance.

4. The method of claim 1, and further comprising verifying whether power levels of the received signals from the set of DME transponders have a same order as the distances for the respective DME transponders in the set of DME transponders.

5. The method of claim 4, further comprising replacing the DME transponder in the subset of DME transponders with another DME transponder from the set of DME transponders when the power level for one of the DME transponders in the subset of DME transponders does not correlate to the distance.

6. The method of claim 1, wherein selecting a subset of DME transponders comprises selecting a subset of at least three DME transponders.

7. The method of claim 6, wherein the second threshold is two.

8. The method of claim 1, wherein autotuning to the frequency corresponding to the frequency of the DME transponder includes transmitting an interrogation pulse pair to the DME transponder and receiving a reply pulse pair on a different frequency.

9. The method of claim 8, wherein determining the real slant range comprises determining a time difference between the interrogation pulse pair and the reply pulse pair.

10. The method of claim 9, wherein calculating the expected slant range based on height includes measuring an altitude with a radio altimeter.

11. A method for detecting spoofing in a Global Navigation Satellite System (GNSS), the method comprising:
receiving signals at a GNSS receiver that purport to be from satellites in the GNSS;
processing the signals to determine a calculated position of the GNSS receiver searching a list of distance measuring equipment transponders (DME transponders) around the calculated position to select a set of DME transponders for testing an integrity of the signals received by the GNSS receiver;
sorting the set of DME transponders in order based on a respective distance between the calculated position and a respective position of each of the DME transponders in the set of DME transponders;
selecting a subset of the DME transponders from the set of DME transponders based on the sorting;
for each DME transponder in the subset of the DME transponders, autotuning to a frequency corresponding to a frequency of the DME transponder;
recording a real time delay for the DME transponder;
sampling and filtering a power level of a received signal from the DME transponder for a period;
calculating an expected time delay based on a height, position, and known location of the DME transponder;
comparing the real time delay with the expected time delay to produce a difference; and when the difference exceeds a first threshold, incrementing a counter;

when the counter exceeds a second threshold, indicating that the position is spoofed and broadcasting an indication to vehicles or ground stations.

12. The method of claim 11, and further comprising, for each DME transponder in the subset of the DME transponders,
correlating the power level to the time delay between the calculated position and the position of the corresponding DME transponder, and
wherein incrementing the counter comprises incrementing the counter if (1) the power level correlates to the time delay between the calculated position and the position of the corresponding DME transponder; and (2) the difference exceeds the first threshold.

13. The method of claim 12, further comprising replacing the DME transponder in the subset of DME transponders with another DME transponder from the set of DME transponders when the power level does not correlate to the time delay.

14. The method of claim 11, and further comprising verifying whether power levels of the received signals from the set of DME transponders have a same order as the time delay for the respective DME transponders in the set of DME transponders.

15. The method of claim 14, further comprising replacing the DME transponder in the subset of DME transponders with another DME transponder from the set of DME transponders when the power level for one of the DME transponders in the subset of DME transponders does not correlate to the time delay.

16. The method of claim 11, wherein autotuning to the frequency corresponding to the frequency of the DME transponder includes transmitting an interrogation pulse pair to the DME transponder and receiving a reply pulse pair on a different frequency.

17. The method of claim 16, wherein recording a real time delay comprises determining a time difference between the interrogation pulse pair and the reply pulse pair.

18. A system for detecting Global Navigation Satellite System (GNSS) spoofing, the system comprising:
a GNSS receiver that is configured to receive signals that purport to be from satellites in the GNSS;
a processor, in communication with the GNSS receiver, that is configured to run a spoofing detection function, which, when executed by the processor cause the processor to perform the method including:
calculating a position of the GNSS receiver using the signals;
searching a list of distance measuring equipment transponders (DME transponders) around the calculated position to select a set of DME transponders for testing for GNSS spoofing;
sorting the set of DME transponders in order based on a respective distance between the calculated position and a respective position of each of the DME transponders in the set of DME transponders;
selecting a subset of the DME transponders based on the sorting;
for each of the subset of the DME transponders, incrementing a counter when a difference between a real slant range, determined by communicating with the DME transponder, and an expected slant range based on a height, position and known location of the DME transponder, exceeds a first threshold; and
when the counter is greater than a second threshold, indicating that the position is spoofed.

19. The system of claim 18, wherein, for each of the subset of the DME transponders, the spoofing detection function, when run on the processor, further causes the processor to perform the method including:
- sampling and filtering a power level of a received signal from the DME transponder for a period; and
- correlating the power level to the distance between the calculated position and the position of the corresponding DME transponder.

20. The system of claim 19, and wherein the spoofing detection function, when run on the processor, further causes the processor to perform the method including verifying whether power levels of the received signals from the set of DME transponders have a same order as the distances for the respective DME transponders in the set of DME transponders.

* * * * *